(No Model.)
J. A. HUDGENS.
WAGON HUB.
No. 253,052. Patented Jan. 31, 1882.
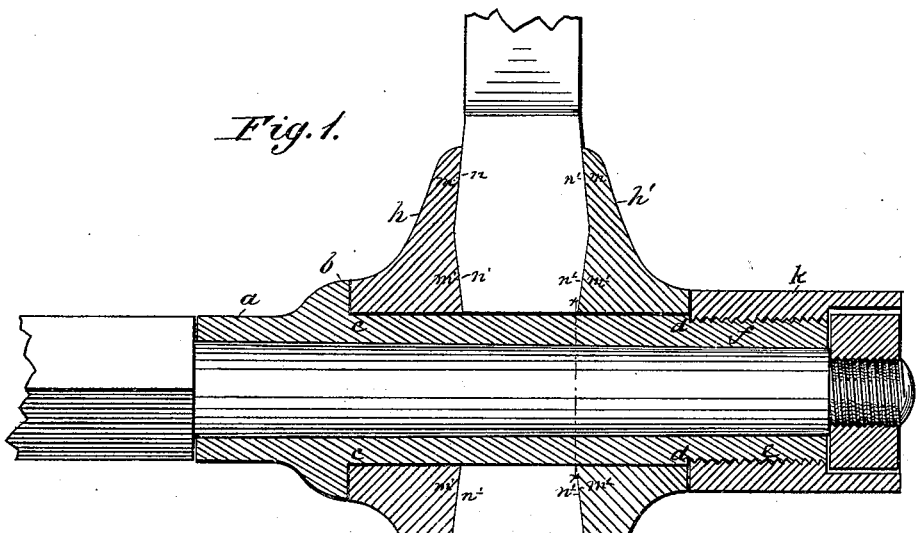
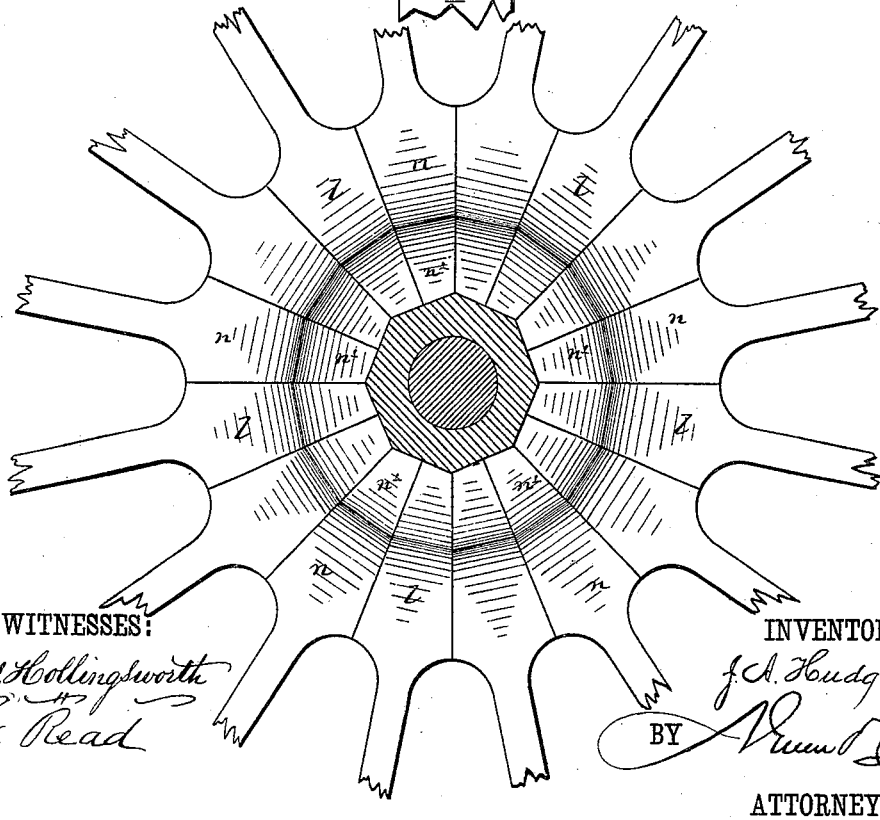
WITNESSES:
W. W. Hollingsworth
W. Read
INVENTOR:
J. A. Hudgens
BY
ATTORNEYS.

UNITED STATES PATENT OFFICE.

JOHN A. HUDGENS, OF PINE BLUFF, ARKANSAS.

WAGON-HUB.

SPECIFICATION forming part of Letters Patent No. 253,052, dated January 31, 1882.

Application filed November 26, 1881. (No model.)

*To all whom it may concern:*

Be it known that I, JOHN A. HUDGENS, of Pine Bluff, in the county of Jefferson and State of Arkansas, have invented a new and useful Improvement in Wagon-Hubs; and I do hereby declare that the following is a full, clear, and exact description of the same, reference being had to the accompanying drawings, forming part of this specification, in which—

Figure 1 is a vertical longitudinal section of my improved hub. Fig. 2 is a transverse section on line $x\ x$, Fig. 1.

My invention relates to improvements in a wagon-hub for which Letters Patent were granted to me dated November 8, 1881, No. 249,358; and my improvements in said patent consist in hollowing out the inner faces of both hub-collars, so as to form on the inner face of each hub two beveled surfaces, intersecting each other, for the reception of outwardly-projecting double-beveled surfaces formed on the side faces of the spokes, whereby the collars are braced by being hollowed out, and the spokes strengthened near their butts by being made larger, and the spokes more securely held in place by the double bevels on the collars and spokes, as hereinafter more fully set forth.

In the accompanying drawings, $a$ represents a tapering metallic axle-box provided with a circular shoulder, $b$, near its inner end, against which the inner hub-collar abuts when the wheel is put together. That portion of the periphery of the axle-box lettered $c\ d$, lying between the circular shoulder $b$ and a hub, (hereinafter described,) which receives the hub-collars, is made polygonal in form, and the remaining portion of the axle-box $f$ is made cylindrical and screw-threaded on its outer surface, as shown at $e$.

$h$ represents the inner, and $h'$ the outer, hub-collar, each of which is provided with a central orifice, the periphery of which is of the same polygonal form as the polygonal part of the axle, so that the hub-collars can readily be slipped lengthwise on the axle-box and be prevented from turning thereon. The inner faces of both hub-collars $h\ h'$ are each hollowed out, so as to form two beveled surfaces, $m\ m'$, intersecting each other and forming an obtuse angle.

$k$ represents a nut screwed on the outer end of the axle-box.

$l\ l$ represent the spokes of the wheel, having their lower front faces tapering and abutting against each other. The ends of the spokes are squared and rest against the polygonal faces of the axle-box. The side faces of the spokes, which in my patent above referred to are straight, I construct of two plane surfaces, $n\ n'$, intersecting each other, and forming the same obtuse angle as is formed between the surfaces $m\ m'$, so that the double-beveled surfaces $n\ n'$ in the sides of the spokes fit into the correspondingly-beveled surfaces $m\ m'$ in the hub-collars. By this construction the collars are braced by being hollowed out and the spokes strengthened by having a larger area near their butts, and the spokes are more securely held in place.

I am aware that it is not new, broadly, to form shoulders on a spoke adapted to fit into recesses in collars, and I therefore lay no claim broadly to such construction.

What I claim as my invention is—

The combination, with the tapering axle-box $a$, provided with the circular shoulder $b$, polygonal part $c\ d$, and cylindrical outer end, $f$, screw-threaded on its periphery, of the hub-collars $h\ h'$, provided with double-beveled surfaces $m\ m'$ on their inner faces, and polygonal central orifices, nut $k$, and spokes $l$, having their squared ends resting against the polygonal faces of the axle-box, their front faces beveled inwardly and abutting against each other, and their side faces provided with the inclined planes $n\ n'$, fitting against the surfaces $m\ m'$ of the collars, substantially as described, and for the purpose set forth.

JOHN AMBROSE HUDGENS.

Witnesses:
G. W. PRIGMORE,
C. M. NEEL.